Aug. 24, 1954 — H. SINCLAIR — 2,687,013
ROTARY HYDRAULIC COUPLING
Filed Jan. 14, 1950 — 5 Sheets-Sheet 2
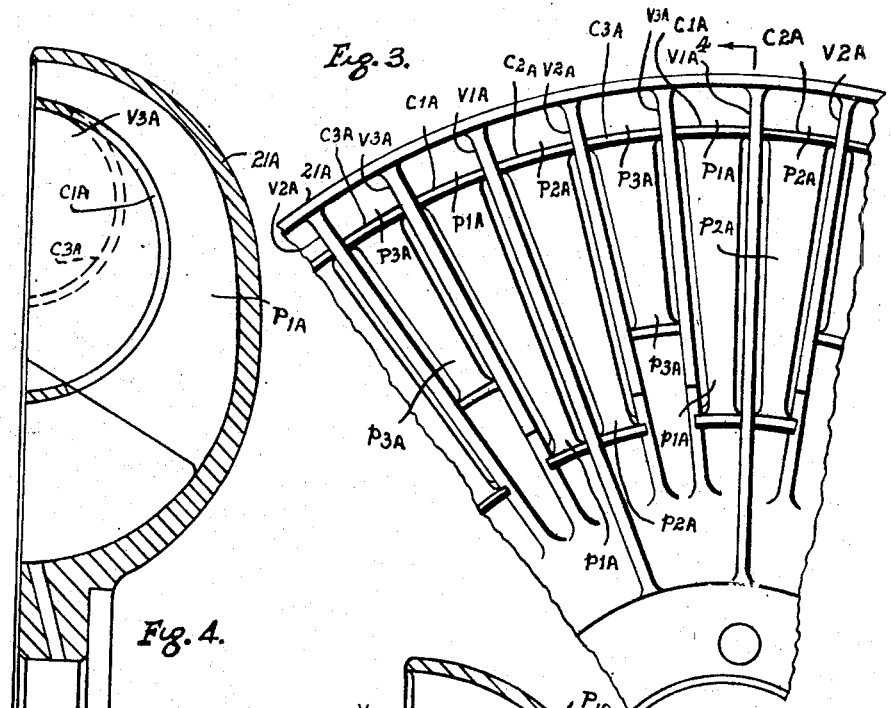
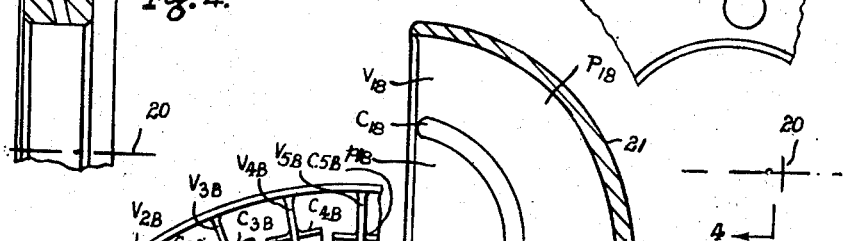
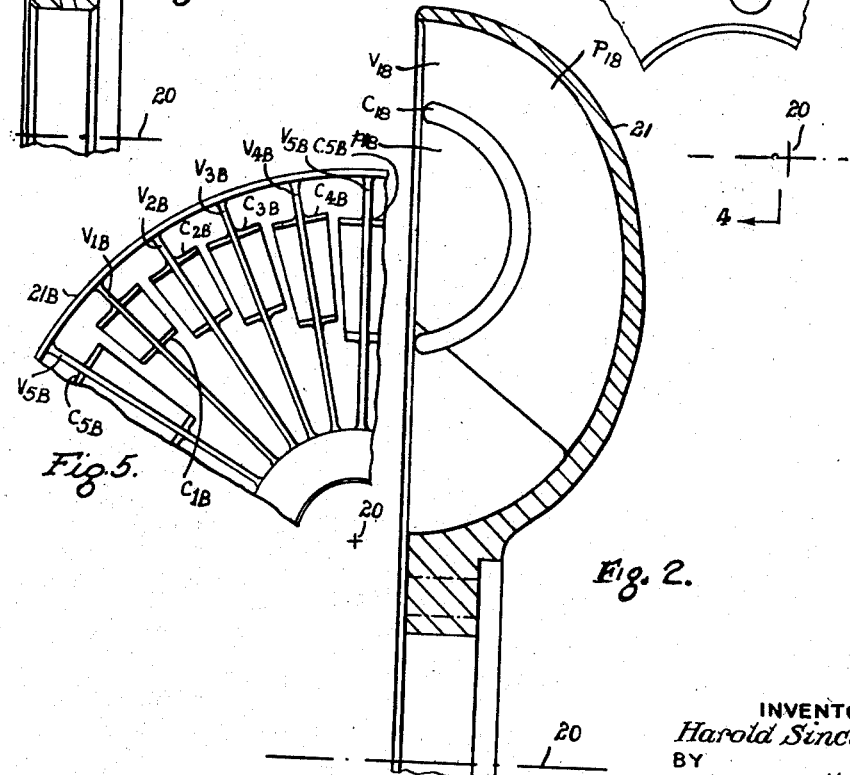
INVENTOR
Harold Sinclair
BY
Dean Fairbank & Hirsch
ATTORNEYS Aug. 24, 1954  H. SINCLAIR  2,687,013
ROTARY HYDRAULIC COUPLING
Filed Jan. 14, 1950  5 Sheets-Sheet 3
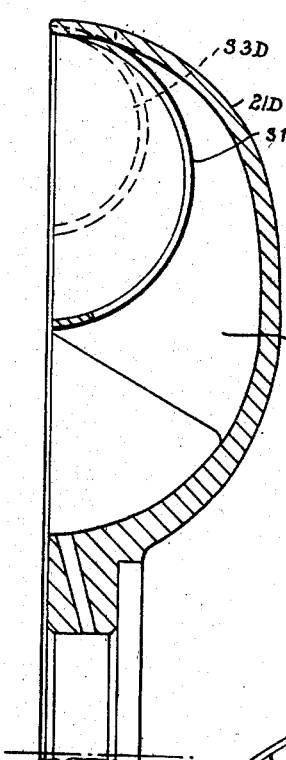
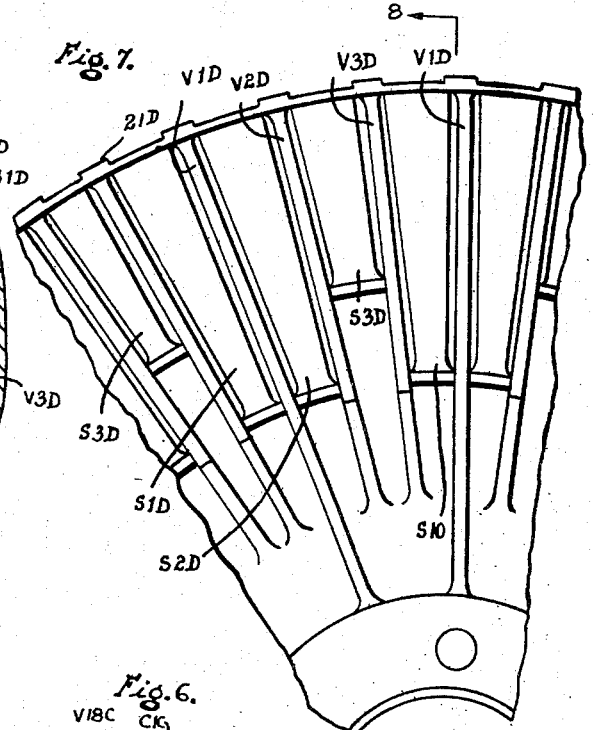
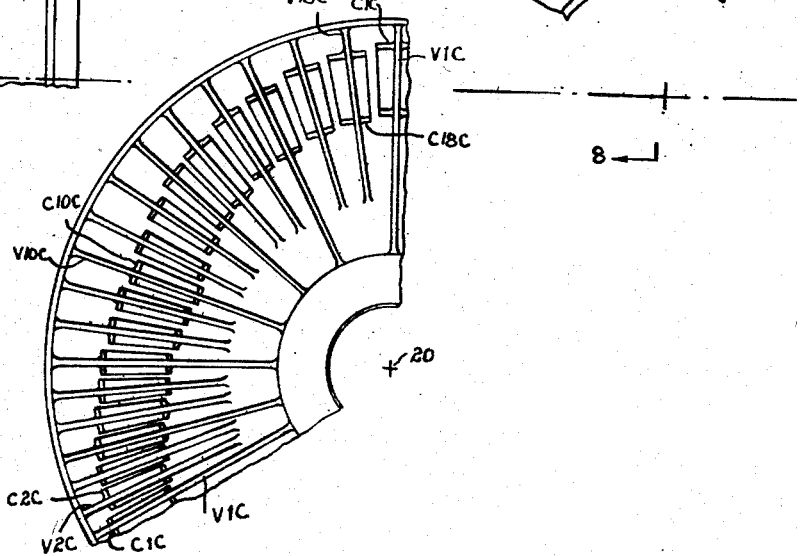
INVENTOR
Harold Sinclair
BY
ATTORNEYS

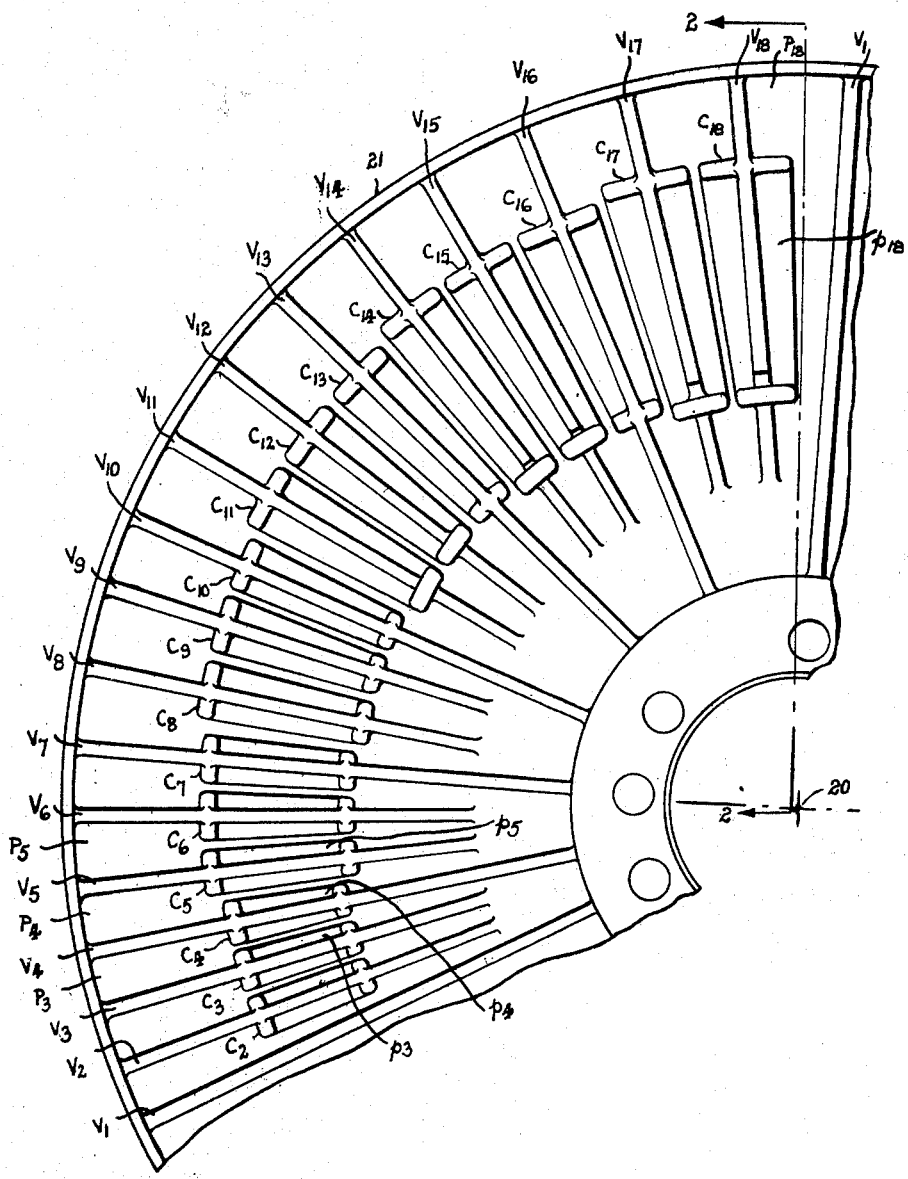

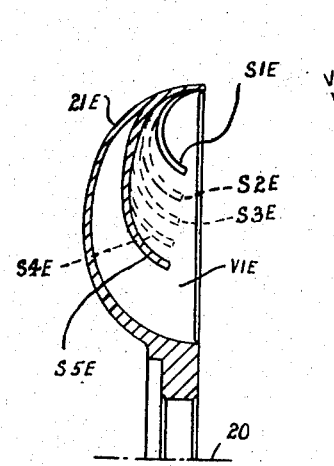
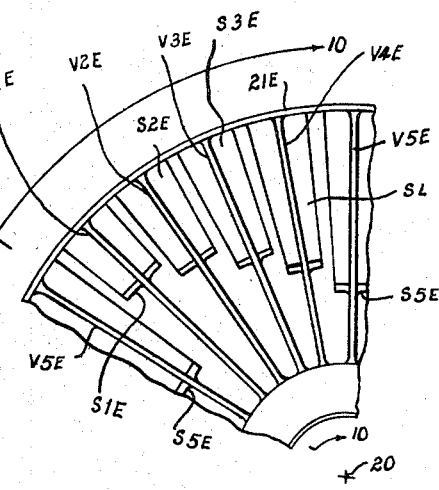
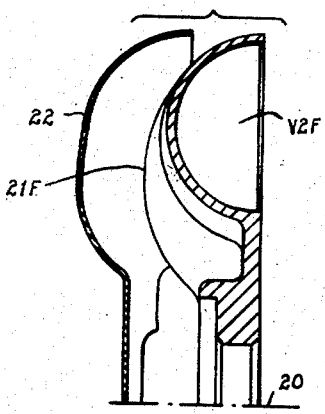
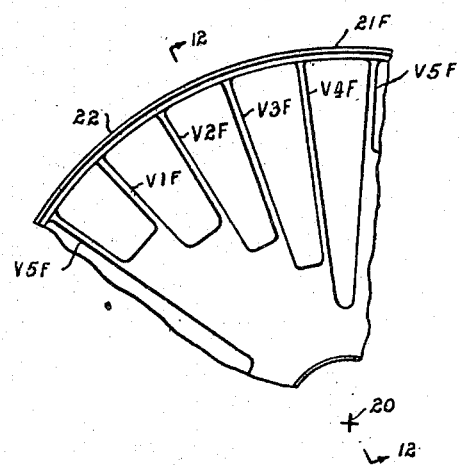

Aug. 24, 1954
H. SINCLAIR
2,687,013
ROTARY HYDRAULIC COUPLING
Filed Jan. 14, 1950
5 Sheets-Sheet 5
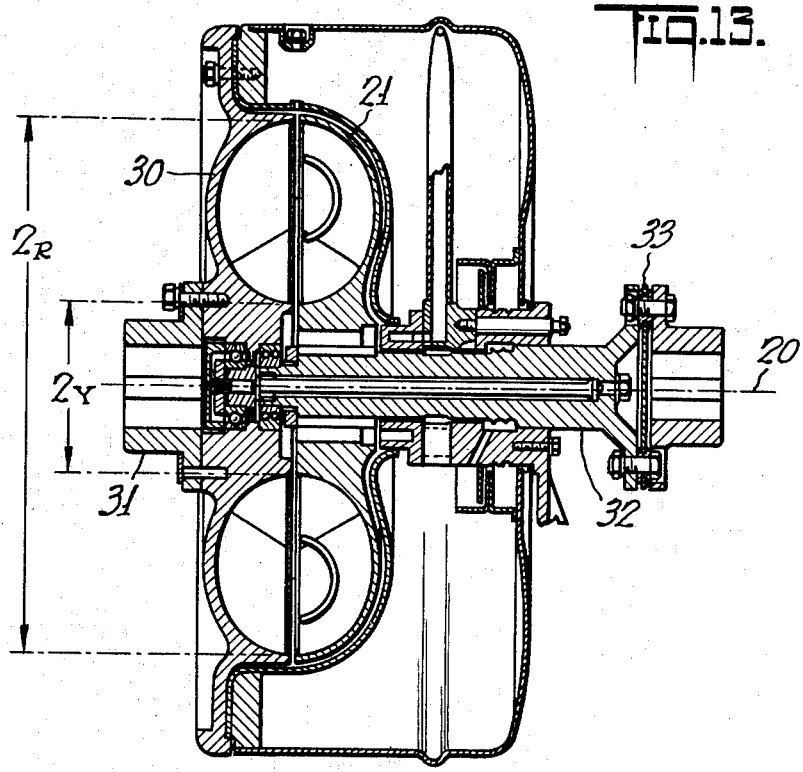
INVENTOR.
Harold Sinclair
BY
ATTORNEYS Patented Aug. 24, 1954

2,687,013

UNITED STATES PATENT OFFICE 2,687,013

ROTARY HYDRAULIC COUPLING

Harold Sinclair, London, England

Application January 14, 1950, Serial No. 138,543

Claims priority, application Great Britain
January 18, 1949

17 Claims. (Cl. 60—54)

This invention relates to hydraulic turbo-couplings of the kind having an impeller element and a runner element, each including an annular dished shell provided with radial or substantially radial vanes, which elements are placed face to face so that their inter-vane pockets combine to form a toroidal working circuit in which working liquid will circulate as a vortex in response to slip between the elements, the coupling being intended to operate, at least at times, with its working circuit only partly filled with working liquid. Thus the couplings may be provided with control means operable while the coupling is running for varying the liquid content of the working circuit. Alternatively the coupling may be provided with a reservoir space outside the working circuit and be so arranged that some working liquid is transferred between the working circuit and the reservoir space automatically in response to changes in the operating conditions; such a coupling is described in my Patent No. 2,301,645. As a further alternative the coupling may be so arranged that the liquid content can be varied only when the coupling is stationary.

Hydraulic turbo-couplings are often provided with a continuous core guide ring in either or both of the impeller and runner elements, around which ring the vortex circulation takes place, and which therefore separates the flow and the return junctions between the coupling elements.

In another well-known form of such coupling, described in Alison Patent No. 2,139,107, at least one of the vaned elements has a core guide ring interrupted in such a manner as to permit, under certain working conditions, the flow of working liquid, across at least a part of the core space, from or to points between the flow and return junctions.

Hydraulic turbo-couplings of the kind referred to are commonly used for the transmission of power from a constant-speed motor to a load the speed of which is varied by varying the liquid filling of the working circuit; and when the load is one, such as a fan or a centrifugal pump, the torque of which rises as its speed increases, it has been found that the use of a continuous core ring in the runner causes a flat spot in the slip/filling characteristic curve of the coupling. The method adopted to eliminate the flat spot has been to provide interrupted core rings in both impeller and runner of the coupling, as explained in my paper "Some problems in the transmission of power by fluid couplings," Proceedings of the Institution of Mechanical Engineers, June 1938, at pp. 85–88.

Where a hydraulic turbo-coupling of the kind referred to is required to connect a constant-speed motor to a load, such as a conveyor, which imposes a substantially constant torque, and which is required to be driven at a varying speed by varying the liquid filling of the working circuit of the coupling, the use of an interrupted core guide ring in the runner may tend to cause instability over part of the range in the coupling speed characteristic, and a more stable speed characteristic is obtained with a continuous core guide ring in the runner and an interrupted core guide ring in the impeller, however at the cost of an increase in slip when the working circuit is full.

The stability of the speed characteristic is concerned with the shapes of the family of curves which correspond respectively to different degrees of filling of the working circuit, and which relate torque plotted as ordinate against slip as abscissa. Obviously for good speed stability these curves should have a substantial slope: flatness of the curves is attended by a tendency for the speed of the driven machine to vary over a wide range for a given variation in load torque, when the working circuit is partly filled. When the working circuit is full, the slope is extremely steep, and variation in load torque causes very little variation in speed.

An open-circuit or coreless coupling in which the vanes are relatively closely pitched, e. g. the couplings described in the said Patent No. 2,301,645 has the advantage that the slip is very low when the working circuit is full, but there is an unsatisfactory spacing of the torque/slip curves relating respectively to various degrees of filling, and, if such a coupling is operated in the partly filled condition the speed characteristic is poor owing to the flatness of the torque/slip curves.

An object of this invention is to provide a hydraulic turbo-coupling of the kind referred to with new and advantageous working characteristics.

Another object is to provide such a coupling which, when used with a constant-speed motor to drive a load at a variable speed, combines the advantages of a reasonably low minimum slip, a satisfactory spacing of the torque/slip curves relating respectively to various degrees of filling and a reasonably good slope of these curves such as to give more or less even changes in speed of the load for equal changes in filling, both when the load has a substantially constant torque and also when its torque rises with increase in speed.

If the proportions of a turbo-coupling could be changed while the coupling was operating, it would be possible to select at any time a working characteristic suitable for the instantaneous requirements of varying working conditions; and it has been proposed to provide turbo-couplings with moving parts in the working circuit with the object of throttling or otherwise varying the flow passages, whereby the characteristics could be varied to a limited extent. These proposals have however not met with practical success, and such moving parts are objectionable in rendering the coupling complicated, expensive and unreliable.

The present invention approaches the problem in a new way by, in effect, selecting two or more different couplings proportioned respectively to yield satisfactory characteristics over different parts of the required range of varying working conditions, and by making a composite coupling from sectors of the different couplings arranged in succession in the circumferential direction.

According to this invention, in a hydraulic turbo-coupling of the kind referred to, the shapes of some of the inter-vane pockets of at least one of the vaned elements, as disclosed by section planes containing the axis of rotation of the coupling, differ from the shapes of the other pockets of that element.

The said one element may be the runner, and the impeller element may be coreless, the shapes of the inter-vane pockets of the impeller, as disclosed by section planes containing the axis of rotation of the coupling, being all alike.

A coupling according to the invention can be designed to have a characteristic which will satisfy a range of varying operating conditions more effectively than would the characteristic of a coupling having a regular circuit the proportions of which resulted from an attempt to strike an average of the proportions of various different couplings known to yield respectively satisfactory characteristics over different parts of the desired working range.

Various embodiments of the invention will be described by way of example and with reference to the accompanying drawings, in which:

Figure 1 is an end elevation of part of one form of vaned element made in accordance with the invention.

Figure 2 is a section on the line 2—2 in Figure 1.

Figure 3 is a view similar to Figure 2, but showing a modification of the vaned element shown in Figure 1.

Figure 4 is a section on the line 4—4 in Figure 3.

Figures 5 and 6 are end elevations of parts of two other modifications of the form shown in Figure 1.

Figure 7 is an end elevation of part of another form of vaned element according to the invention.

Figure 8 is a section on the line 8—8 in Figure 7.

Figure 9 shows a modification of the form shown in Figure 8.

Figure 10 is a developed section, taken on the line 10—10 in Figure 9.

Figure 11 is an end elevation of part of yet another example of vaned element according to the invention.

Figure 12 is a section on the line 12—12 in Figure 11, and

Figure 13 is a view in section through the axis of a hydraulic coupling embodying a runner element according to the invention.

In the embodiments shown in Figures 1 to 6, the coupling element is provided, in accordance with the invention in one form, with core guide means, and the shapes of some of the inter-vane passages between the core guide means and the dished shell of the element, as disclosed by section planes containing the axis of rotation of the coupling, differ from the shapes of the other inter-vane passages. In the embodiments shown in Figures 1 to 5, the cross-sectional areas of the core guide means, as disclosed by the said section planes, differ from section to section around the axis. In the last-mentioned embodiments and also in that shown in Figure 6, the spacing of the core guide means from the axis of rotation of the coupling differs from section to section around the axis. In Figures 1 to 5 the core guide means are an interrupted core guide ring comprising separate ring segments of different cross-sectional areas. In the last-mentioned figures and also in Figure 6 the separate core guide ring segments are differently spaced from the said axis. In each embodiment having core guide means, these means are hollow and open at the junction face of the element, the vanes extending across the core area.

Figures 1 and 2 show a coupling runner suitable for use with an impeller of known type and having the same inner and outer profile diameters as the runner and no core guide means. A hydraulic coupling embodying such an impeller and runner is shown in Figure 13, and comprises an impeller element 30 fixed to a driving shaft 31 and placed coaxially face to face with the runner element 21 which is keyed to a runner shaft 32. A flexible coupling 33 serves to connect the runner shaft 32 to any driven machine. The outer and inner profile diameters 2R and 2r (Figure 13) of the coupling elements are respectively 23 ins. and 7 ins. The axis of rotation is denoted by 20.

Referring to Figures 1 and 2, a dished annular shell 21 is fitted with vanes arranged in three identical groups each covering a sector of 120°. Each vane group consists of eighteen vanes $V_1$ to $V_{18}$. Vanes numbered $V_1$, $V_4$, $V_7$, $V_{10}$, $V_{13}$ and $V_{16}$ of the group extend to the return junction at the inner profile diameter. The inner ends of the remaining vanes are cut back in the usual way in order to avoid undue constriction of the return junction due to the thickness of the vanes. Vanes $V_1$ and $V_2$ are spaced at an interval of 4½°. The vane spacing increases by ¼° at each vane up to vane $V_{16}$ which is therefore spaced from vane $V_{15}$ by 8°. Vane $V_{17}$ is spaced from vane $V_{16}$ by 8½°, vane $V_{18}$ from vane $V_{17}$ by 8¾° and vane $V_{18}$ from vane $V_1$ of the next group by 9°. Each vane except $V_1$ carries a separate approximately semi-cylindrical segment $C_2$ to $C_{18}$ of interrupted core guide ring which is shaped as a 180° sector of a cylindrical tube and which projects equally on each side of the vane. Each such core segment is separated from the segment on the next adjacent vane by a gap $\frac{3}{16}$ in. wide. The core guide ring segments are graded in radius from 1 in. at $C_2$ to $1\frac{5}{16}$ ins. at $C_{18}$. The interrupted core guide ring may increase in diameter from vane to vane in uniform steps. However for convenience in manufacture the ring segments in this example are arranged in groups of two and three, the segments in each group being of the same radius, as follows:

| Cone numbers | 2–4 | 5–7 | 8–10 | 11–13 | 14–16 | 17, 18 |
|---|---|---|---|---|---|---|
| Vane radius: inch | 1 | $1\frac{3}{16}$ | $1\frac{3}{8}$ | $1\frac{9}{16}$ | $1\frac{3}{4}$ | $1\frac{15}{16}$ |

The inter-vane pockets in this embodiment thus consist of inter-vane passages such as $P_3$, $P_4$ and $P_5$ between the shell 21 and the core guide segments and subsidiary inter-vane pockets such as $p_3$, $p_4$ and $p_5$ inside the core segments, each of these passages communicating by the gap between the core segments with the subsidiary pocket which it surrounds. It will be apparent that the shapes of the passages $P_3$ and $P_5$ for example are different, as viewed in section planes containing the axis 20, and that the cross sectional areas of subsidiary pockets $p_3$ and $p_5$ for example are also different as viewed in the said planes, as are their spacings from the axis 20.

The vaned element shown in Figures 3 and 4, which may be used as a runner in a coupling such as that shown in Figure 13 having an impeller without core guide means, has a shell 21A fitted with fifty-one vanes arranged in groups of three, each group consisting of a long vane $V_1A$ and two short vanes $V_2A$ and $V_3A$. Core guide segments $C_1A$, $C_2A$ and $C_3A$ are rather shorter, as measured circumferentially of the coupling, than the width of the inter-vane pockets, except at the parts adjacent to the flow and return junction face of the runner, where the segments are broadened and united to the vanes which support them. Segments $C_1A$ and $C_2A$ are alike and of larger radius, as viewed in Figure 4, than segments $C_3A$. All the outer ends of the segments are at the same distance from the axis 20. Consequently the shape of the inter-vane passages $P_1A$ and $P_2A$ differs from that of the passages $P_3A$; the cross-sectional area of the subsidiary pockets $p_1A$ and $p_2A$ differs from that of the subsidiary pockets $p_3A$; and the spacing of the segments $C_1A$ and $C_2A$ from the axis 20 is shorter than that of the segments $C_3A$. Each inter-vane passage communicates by the two gaps between the core segment and the adjacent vanes with the subsidiary pocket which it surrounds.

Figure 5 shows a modification having a shell 21B containing like vanes arranged in groups of five, $V_1B$ to $V_5B$, carrying respectively segments $C_1B$ to $C_5B$ of an interrupted hollow core guide ring across which the vanes extend. The segments of each group are of progressively larger cross-sectional areas, and their spacings from the outer profile diameter of the shell 21B progressively increase.

Figure 6 shows a further modification in which the vanes are arranged in groups of eighteen, $V_1C$ to $V_{18}C$, irregularly spaced like the vanes in Figure 1. The vanes carry respectively segments $C_1C$ to $C_{18}C$ of an interrupted hollow core guide ring, the cross sections of which, as disclosed by section planes containing the axis 20, are identical. The segments from $C_1C$ to $C_{10}C$ are progressively closer to the axis 20, and from $C_{10}C$ to $C_1C$ of the next group progressively farther from this axis.

The embodiments shown in Figures 7 to 10 are of a form of the invention in which at least one of the vaned elements of the coupling is provided with a secondary annular dished shell accommodated within the main shell, the outer profile diameters of the two shells being equal or substantially equal, and in which the vanes extend across the secondary shell. In the last-mentioned form of the invention, the shapes of the portions of some of the inter-vane pockets within the secondary shell, as disclosed by section planes containing the axis of rotation of the coupling, may differ from the shapes of the portions of the other of the inter-vane pockets within the secondary shell. The secondary shell may be interrupted consisting of separate segments of different shapes.

Figures 7 and 8 show a coupling runner element, suitable for use in combination with a coreless impeller of known type and having a shell 21D provided with fifty-one uniformly pitched vanes arranged in groups of three, each group consisting of a long vane $V_1D$ and two short vanes $V_2D$ and $V_3D$. An interrupted subsidiary shell consists of shell segments $S_1D$, $S_2D$ and $S_3D$ which are rather shorter, measured circumferentially of the coupling, than the width of the inter-vane pockets, except at their radially inner ends, where they are broadened and united to the vanes which support them. The radially outer ends of the shell segments are fitted into the periphery of the main shell 21D, so that the outer profile diameters of the main shell and of the interrupted subsidiary shell are the same. Segments $S_1D$ and $S_2D$ are alike and of larger radius, as viewed in Figure 8, than segments $S_3D$. The inter-vane pockets are therefore divided into subsidiary pockets of two different shapes and main passages which have restricted return junctions provided by the pairs of slots between the vanes and the subsidiary shell segments, and which also are of two different shapes.

Figures 9 and 10 show a modification of the last-described runner in which a shell 21E is provided with vanes arranged in groups of five, $V_1E$ to $V_5E$. An interrupted subsidiary shell consists of shell segments $S_1E$ to $S_5E$ of progressively longer radius carried respectively by the vanes $V_1E$ to $V_5E$. Each inter-vane pocket is divided into two subsidiary pocket portions of different shapes and a main passage having a restricted return junction provided by the slot between the subsidiary pocket portions.

Figures 11 and 12 exemplify another form according to the invention and in which the shapes of some portions of the shell of the coupling element, as disclosed by section planes containing the axis of rotation of the coupling, differ from the shapes of other portions of the shell. In such an arrangement the element may be coreless, and the different shapes may form a repeating pattern around the element.

The runner shown in Figures 11 and 12 is suitable for use with a coreless impeller of known type and is provided with vanes arranged in groups of five, $V_1F$ to $V_5F$. All intervane pockets have the same outer profile diameter. The pocket between vanes $V_1F$ and $V_2F$ is of larger cross section and has a smaller inner profile diameter than the pocket between vanes $V_5F$ and $V_1F$; the pocket between vanes $V_2F$ and $V_3F$ is of larger cross section and has a smaller inner profile diameter than the pocket between vanes $V_1F$ and $V_2F$; and so on to the end of the group. An annular dished cover 22 of uniform cross section may be fitted to the back of the runner so as to provide a smooth exterior. It will be apparent that the runner is shown in "exploded" view in Figure 12.

Although the examples shown in the drawings have the variations following a repeating pattern, this is not essential, provided the element is balanced; the variations are preferably arranged in symmetrical groups.

Runners arranged in accordance with this invention may be used in both constant-torque and variable-torque drives in combination with a coreless impeller. No advantage is at present known to me in applying the invention to impellers, except the use of common core patterns for both impeller and runner when only a few couplings are required of a given size.

I claim:

1. A hydraulic turbo-coupling of the kind having a rotary impeller element and a rotary runner element, each including an annular dished shell provided with substantially radial vanes, which elements are placed face to face so that their inter-vane passages combine to form a toroidal working circuit in which working liquid will circulate as a vortex in response to slip between the elements, the coupling being capable of operating, at least at times, with its working circuit only partly filled with working liquid, wherein the shapes of some of the inter-vane passages of at least the runner element, as disclosed by section planes thereof containing the axis of rotation of the coupling, differ from the shapes of some other passages of the said runner element.

2. A hydraulic coupling as claimed in claim 1, wherein the impeller element is coreless and the shapes of the inter-vane passages of the impeller, as disclosed by section planes thereof containing the axis of rotation of the coupling, are all alike.

3. A hydraulic coupling as claimed in claim 1, wherein the said runner element is provided with core guide means and wherein the shapes of some of the inter-vane passages between the core guide means and the dished shell of the runner element, as disclosed by the said section planes, differ from the shapes of some other inter-vane passages.

4. A hydraulic coupling as claimed in claim 1, wherein the said runner element is provided with core guide means, wherein the shapes of some of the inter-vane passages between the core guide means and the dished shell of the runner element, as disclosed by the said section planes, differ from the shapes of some other inter-vane passages, and wherein the cross-sectional areas of the core guide means of adjacent inter-vane passages, as disclosed by the said section planes, differ from section to section around the axis.

5. A hydraulic coupling as claimed in claim 1, wherein the said runner element is provided with core guide means, wherein the shapes of some of the inter-vane passages between the core guide means and the dished shell of the runner element, as disclosed by the said section planes, differ from the shapes of some other inter-vane passages, and wherein the spacing of the core guide means of adjacent inter-vane passages from the said axis differs from section to section around the coupling.

6. A hydraulic coupling as claimed in claim 1, wherein the said runner element is provided with core guide means, wherein the shapes of some of the inter-vane passages between the core guide means and the dished shell of the runner element, as disclosed by the said section planes, differ from the shapes of some other inter-vane passages, wherein the cross-sectional areas of the core guide means of adjacent inter-vane passages, as disclosed by the said section planes, differ from section to section around the axis, and wherein the spacing of the core guide means of adjacent inter-vane passages from the said axis differs from section to section around the coupling.

7. A hydraulic coupling as claimed in claim 1, wherein the said runner element is provided with core guide means, and wherein the core guide means is an interrupted core guide ring comprising separate ring segments, some having different cross-sectional areas than others.

8. A hydraulic coupling as claimed in claim 1, wherein the said runner element is provided with core guide means, and wherein the core guide means is an interrupted core guide ring comprising separate ring segments, some of which are differently spaced from the said axis than others.

9. A hydraulic coupling as claimed in claim 1, wherein the said runner element is provided with core guide means, wherein the shapes of some of the inter-vane passages between the core guide means and the dished shell of the runner element, as disclosed by the said section planes, differ from the shapes of some other inter-vane passages, wherein the core guide means are hollow and open at the junction face of the runner element, and wherein the vanes extend across the core area.

10. A hydraulic coupling as claimed in claim 1, wherein the said runner element is provided with a secondary annular dished shell accommodated within the main shell, the outer profile diameters of the two shells being substantially equal, and wherein the vanes extend across the secondary shell.

11. A hydraulic coupling as claimed in claim 1, wherein the said runner element is provided with a secondary annular dished shell accommodated within the main shell, the outer profile diameters of the two shells being substantially equal, wherein the vanes extend across the secondary shell, and wherein the shapes of the portions of some of the inter-vane pockets within the secondary shell, as disclosed by the said section planes, differ from the shapes of the portions of some other of the inter-vane pockets within the secondary shell.

12. A hydraulic coupling as claimed in claim 1, wherein the said runner element is provided with a secondary annular dished shell accommodated within the main shell, the outer profile diameters of the two shells being substantially equal, wherein the secondary shell is interrupted and consists of separate segments some of which are of different shapes, and wherein the vanes extend across the secondary shell.

13. A hydraulic coupling as claimed in claim 1, wherein the shapes of some portions of the shell of the said runner element, as disclosed by the said section planes, differ from the shapes of some other portions of the shell.

14. A hydraulic coupling as claimed in claim 1, wherein the impeller is coreless, and wherein the shapes of some portions of the shell of the runner element, as disclosed by the said section planes, differ from the shapes of some other portions of the shell.

15. A hydraulic coupling as claimed in claim 1, wherein the different shapes form a repeating pattern around the said runner element.

16. A hydraulic coupling of the type having dished rotary casing sections facing each other, radial vanes in said sections, and an annular core around which liquid circulates between said vanes during rotation of the coupling, said core being formed of circumferentially spaced sections, the coupling being characterized by having some of said core sections at different distances from the axis of rotation of the coupling.

17. A rotary hydraulic coupling of the type having dished rotary casing sections facing each other, radial vanes in said sections, and a core formed of circumferentially spaced sections, said coupling being characterized by having some of said core sections at different distances from the axis of rotation of the coupling.

References Cited in the file of this patent

UNITED STATES PATENTS

| Number | Name | Date |
|---|---|---|
| 2,096,071 | Sinclair | Oct. 19, 1937 |
| 2,139,107 | Alison | Dec. 6, 1938 |
| 2,167,382 | Alison | July 25, 1939 |
| 2,264,340 | Sinclair | Dec. 2, 1941 |
| 2,352,483 | Jandasek | June 27, 1944 |
| 2,355,876 | Lazaga | Aug. 15, 1944 |
| 2,370,438 | Basebe | Feb. 27, 1945 |
| 2,421,360 | Swennes | May 27, 1947 |